July 3, 1951  R. B. RANSOM  2,559,563
CONSTANT VELOCITY JOINT
Filed July 2, 1945  2 Sheets-Sheet 1
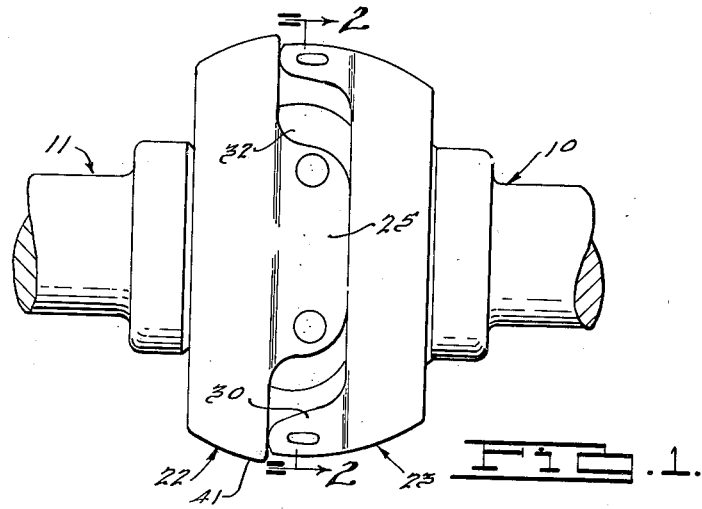
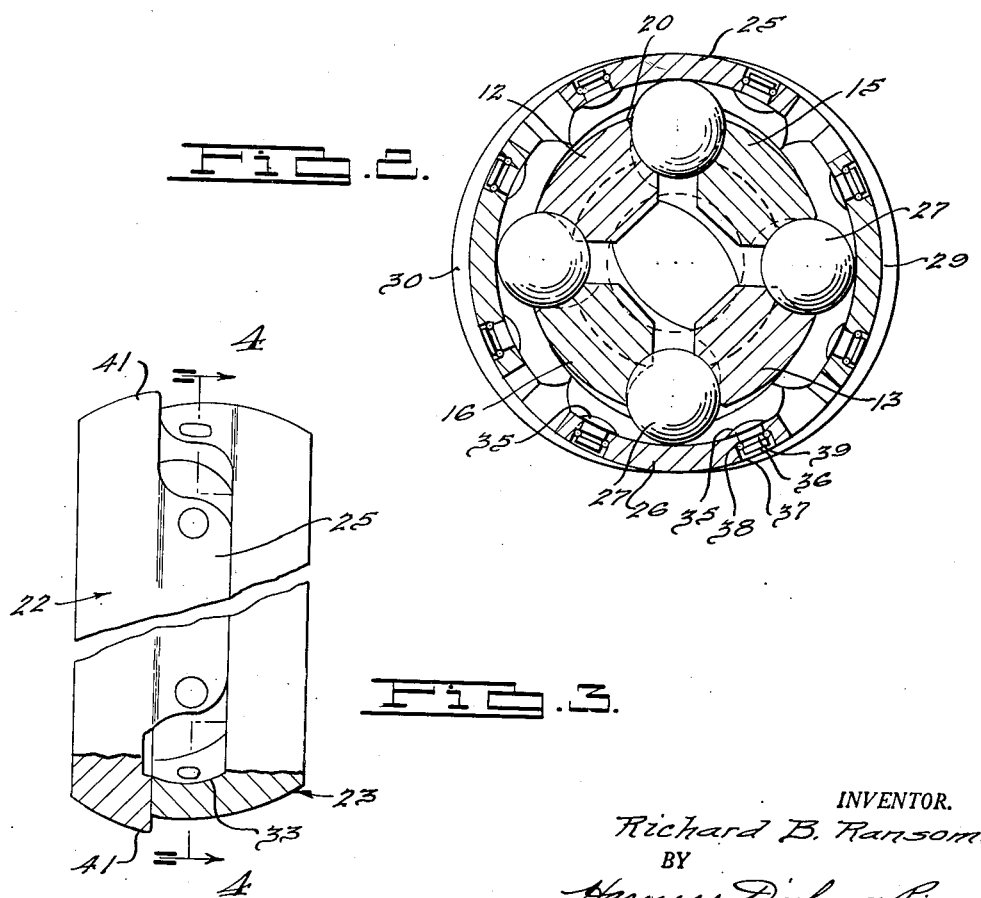
INVENTOR.
Richard B. Ransom.
BY
Harness, Dickey & Pierce
ATTORNEYS.

July 3, 1951  R. B. RANSOM  2,559,563
CONSTANT VELOCITY JOINT
Filed July 2, 1945  2 Sheets-Sheet 2

INVENTOR.
Richard B. Ransom.
BY
Harness, Dickey & Pierce.
ATTORNEYS.

Patented July 3, 1951

2,559,563

UNITED STATES PATENT OFFICE 2,559,563

CONSTANT VELOCITY JOINT

Richard B. Ransom, Knoxville, Tenn., assignor to Universal Products Company Incorporated, Detroit, Mich., a corporation of Delaware Application July 2, 1945, Serial No. 602,706

8 Claims. (Cl. 64—21)

The invention relates to universal joints and it has particular relation to a universal joint of constant velocity character.

Constant velocity joints involving the use of ball races and balls are generally known. Joints of this type have included yokes having ball races in their adjacent side surfaces and the balls have been placed between the yoke arms so as to provide a driving relation. For moving the balls into a bisecting plane, various means have been provided and likewise various means have been employed for centering the yokes on the joint center.

One object of the present invention is to provide a constant velocity type of universal joint employing balls as torque elements wherein improved yokes are used having ball races effective to move the balls into the bisecting plane.

Another object of the invention is to provide an improved means for holding the yokes and balls centered on the joint center.

Another object of the invention is to provide a constant velocity joint of this character which may be readily assembled and disassembled so as to avoid difficulties that have often been encountered in the ball type of constant velocity joints.

Other objects of the invention will become apparent from the following specification, from the drawings relating thereto, and from the claims hereinafter set forth.

For a better understanding of the invention, reference may be had to the drawings wherein:

Figure 1 is a side elevational view of a constant velocity universal joint constructed according to one form of the invention;

Fig. 2 is a cross-sectional view taken substantially along the line 2—2 of Fig. 1;

Fig. 3 is a detail view partly in cross-section, showing the construction of the ring assembly encircling the joint;

Figure 4:
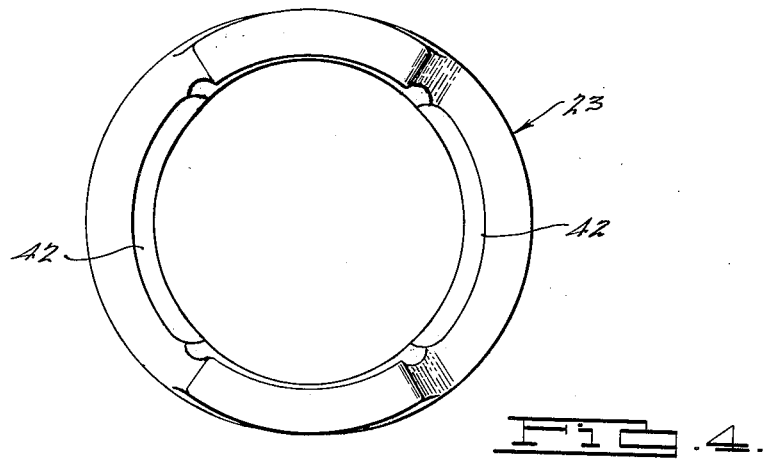
Fig. 4 is a cross-sectional view taken substantially along line 4—4 of Fig. 3 with certain parts left in elevation.

Referring to Figs. 1, 2, 5, and 6, the joint shown comprises shaft elements 10 and 11, and these are identical excepting that they are oppositely disposed. The shaft element 10 comprises a yoke having yoke arms 12 and 13 disposed in diametrically opposed relation while the shaft element 11 comprises a yoke having yoke arms 15 and 16 which are arranged between the first yoke arms. As shown best by Figs. 5 and 6, each of the yoke arms 12 and 13 has opposed ball races 17 and 18 in its circumferentially opposite side faces and these races are arranged in crossing relation as seen best superimposed in Fig. 5. The yoke arm 13 has the same ball races 17 and 18 on its circumferentially arranged faces and on both arms the ball races 17 face in the same circumferential direction, while the ball races 18 face in the opposite circumferential direction.

Figure 5:
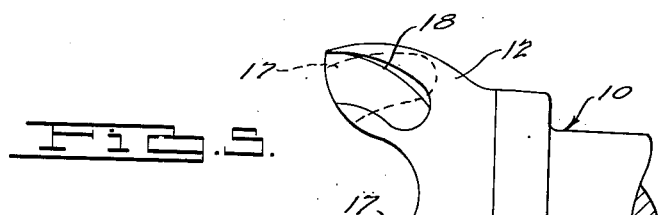
Fig. 5 is a side view of one of the yoke arms.
Figure 6:
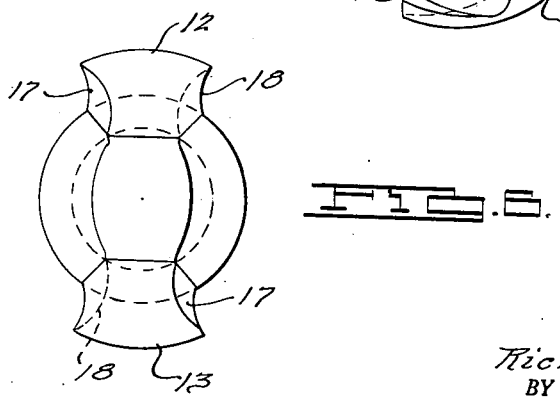
Fig. 6 is an end view of the yoke arm.

The yoke arms 15 and 16 are the same and when placed circumferentially between the arms 12 and 13, the ball race 17 on each yoke arm is paired with the ball race 17 on the adjacent yoke arm. Thus between the circumferentially adjacent ball races on each pair of adjacent yoke arms, the ball races are directed oppositely or in crossing relation. It should be noted, however, and as best seen by Fig. 5, that the ball races 17 and 18 on the same side of the yoke are not the same as the one is extending radially outwardly towards the open end of the arm, while the other, is extending inwardly towards the open end of the arm. It should be noted also in connection particularly with Fig. 2 that the races are of such character that the balls may be inserted from the circumferentially outer sides of the arms and thus may be assembled easily in such races. The races are so arranged as seen in Fig. 2, that the balls can be placed therein from the radially outer side of the arms, and the outer edges of the races may be slightly flared as indicated at 20 so as to facilitate insertion of the balls.

If the balls are retained in the races, the intersecting nature of the races at each ball slot will cause the ball to stay in an angle bisecting position, and thus constant velocity may be obtained. For retaining the balls in the same plane and for also holding them in the slots, an outer ring assembly is provided which comprises two rings 22 and 23. The ring 22, as best shown by Figs. 1, 2, and 3, has a pair of axially projecting diametrically opposite portions 25 and 26 which extend over two diametrically opposite balls indicated at 27, while the ring 23 similarly has axially arranged and diametrically opposed projections 29 and 30 extending over the other balls. The circumferential length of the projections is such as to leave a substantial circumferential space 32 between adjacent ends of the projections, and such ends are so shaped that they will substantially fit in the event the rings should be turned sufficiently to cause engagement. The length of this space 32 is sufficient to permit assembly of the rings with the balls and arms as presently will be seen.

Each of the projections 25, 26, 29, and 30 has an arcuate groove 33 which extends circumferentially and which fits the balls 27. In an axial direction, therefore, this race will remain assembled with the balls once the ball is placed in proper relation thereto, since the race engages the ball on an arc. Once the ring elements and balls are assembled as seen in Fig. 2, rivet-like buttons 35 are secured to each of the projections on circumferentially opposite sides of the ball engaging such projections so as to limit the extent of circumferential movement of the rings relative to the balls. Each of these rivet-like buttons may include a shank 36 projecting outwardly through an opening in the projection and this opening may be enlarged as indicated at 37 so as to permit using a split ring 38 for holding the button in place. This ring fits in an annular groove 39 in the shank 36 and may be inserted and pressed into the opening until it snaps into the groove.

Before describing the manner in which the joint may be assembled, it may be pointed out that the rings 22 and 23 are strengthened in their axially narrow portions by increasing the radial dimensions in these parts of the ring as indicated at 41. These enlargements or increases in radial dimensions are diametrically opposed and therefore they balance each other. At the same time they strengthen the narrower portions of the ring and provide a desired strength and resistance to stresses occurring in operation of the joint. Also it will be noted that the axially narrow portions of each ring are beveled as seen at 42 in Fig. 4 so that they will not interfere with any rise of the balls adjacent thereto and under the other ring.

Assuming that the rings 22 and 23 are on the shaft elements 10 and 11 but removed axially from the yoke arms, the yoke arms may be brought into proper relation as seen in Fig. 2. One ring may be moved over the yoke arms, as for instance the ring 23, so as to bring the projections 25 and 26 over diametrically opposite ball races and then two balls may be placed in the other two ball slots and held there manually until the projections 25 and 26 can be turned sufficiently to cause the grooves or circumferential races 23 on the inner surface of such projections to move over the two balls. Then the projections may be moved in one circumferential direction as far as possible without allowing the two balls to become free, and then the other ring may be moved over the other two ball slots and then turned relative to the ring 23 to the extent permitted by the newly positioned projections 25 and 26, and this will expose the other two ball races to permit insertion of such other two balls. After the last two balls have thus been inserted, the ring 22 is reversely moved until centered over the balls, and the ring 23 is reversely moved until the projections are centered over the balls.

As now assembled the rings can not move apart because the four projections engage the balls by means of arcuate inner surfaces 33 extending circumferentially, and because the balls are held axially by the intersecting ball races at each ball slot. At the same time the rings hold the balls in place and in turn the yoke arms in positions where they are centered on the center of the joint. Either ring can move in a limited circumferential direction relative to the other during operation of the joint and likewise any pair of balls can move circumferentially to any extent necessary without interference on the part of the rings. At the same time, the buttons 35 limit circumferential movement of the ring.

In connection with the buttons, any kind of lug or stop element may be used so as to limit relative circumferential movement of the ring and balls and therefore, the button shown is only one of different elements which might be suitable for this purpose. The construction is such that these buttons can be inserted through the space 32 and outwardly through the openings and then the snap rings 38 may be applied. Elements might be used which could be inserted from the outside also and fastened in place in any suitable way.

Although only one form of the invention has been illustrated and described in detail, it will be apparent to those skilled in the art that various modifications may be made without departing from the scope of the claims.

What is claimed is:

1. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, ring means encircling the arms and having internal circumferential groove means in which the outer portions of the balls are retained, and inward projections on said ring means at said grooves for limiting relative circumferential movement of the ring means relative to the balls.

2. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring having retaining contact with a pair of diametrically opposed balls respectively.

3. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring having retaining contact with a pair of diametrically opposed balls respectively, said projections on the rings being of such circumferential length that the rings may have limited relative movement in a circumferential direction.

4. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring having retaining contact with a pair of diametrically opposed balls respectively, each ring circumferentially between its projections being of increased radial dimensions as compared to the portions circumferentially along the projections.

5. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring having retaining contact with a pair of diametrically opposed balls respectively, each ring circumferentially between its projections being gradually increased in radial dimensions to the points midway between such projections.

6. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring which extend axially over the balls and are provided with circumferentially extending internal grooves having retaining contact with the balls, the projections being of such circumferential length and being so dimensionally related to the balls, that the projections on one ring may be positioned over one pair of opposed ball slots and turned circumferentially and with respect thereto to allow the balls to be inserted and then the projections on the other ring may be positioned over the remaining slots and then turned with respect thereto to allow the other balls to be inserted.

7. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, a pair of diametrically opposite axial projections on each ring which extend axially over the balls and are provided with circumferentially extending internal grooves having retaining contact with the balls, the projections on one ring being disposed cross wise of the projections on the other ring so that each projection on each ring is circumferentially between the projections on the other ring, and means fixed to said axial projections at opposite ends of said circumferential grooves for engaging the balls and thereby limiting circumferential turning of the rings about their centers and relative to the yokes and balls.

8. A universal joint of constant velocity character comprising a pair of yokes having yoke arms arranged in circumferentially spaced relation so as to provide axial slots, the yoke arms at each slot being provided with ball races, balls in said races, the races being so formed that radially outer portions of the balls are disposed radially outwardly of the arms and slots, a pair of rings encircling the arms in side by side relation, and a pair of diametrically opposite axial projections on each ring which extend axially over the balls and are provided with circumferentially extending internal grooves having retaining contact with the balls, the projections on one ring being circumferentially between the projections on the other ring.

RICHARD B. RANSOM.

REFERENCES CITED

The following references are of record in the file of this patent:

UNITED STATES PATENTS

| Number | Name | Date |
| --- | --- | --- |
| 1,677,311 | Weiss | July 17, 1928 |